(12) United States Patent
Li et al.

(10) Patent No.: US 8,458,344 B2
(45) Date of Patent: Jun. 4, 2013

(54) ESTABLISHING TUNNELS BETWEEN SELECTIVE ENDPOINT DEVICES ALONG COMMUNICATION PATHS

(75) Inventors: Qing Li, Cupertino, CA (US); Yusheng Huang, San Jose, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 97 days.

(21) Appl. No.: 13/101,661

(22) Filed: May 5, 2011

(65) Prior Publication Data

US 2012/0284416 A1    Nov. 8, 2012

(51) Int. Cl.
*G06F 15/16* (2006.01)
*G06F 12/14* (2006.01)
*G06F 21/00* (2006.01)
*G06F 153/173* (2010.06)

(52) U.S. Cl.
USPC ............... 709/228; 709/237; 709/11; 709/12; 709/224; 726/23; 726/3

(58) Field of Classification Search
None
See application file for complete search history.

(56) References Cited

U.S. PATENT DOCUMENTS

| | | | | |
|---|---|---|---|---|
| 6,614,809 | B1 * | 9/2003 | Verma et al. | 370/469 |
| 7,966,418 | B2 * | 6/2011 | Shedrinsky | 709/237 |
| 2003/0188001 | A1 * | 10/2003 | Eisenberg et al. | 709/229 |
| 2006/0282894 | A1 * | 12/2006 | Duffield et al. | 726/23 |
| 2008/0276085 | A1 * | 11/2008 | Davidson et al. | 713/161 |
| 2011/0202972 | A1 * | 8/2011 | Jiang | 726/3 |

* cited by examiner

*Primary Examiner* — Andrew Chriss
*Assistant Examiner* — Ajit Reddy
(74) *Attorney, Agent, or Firm* — Baker Botts L.L.P.

(57) ABSTRACT

In one embodiment, an intermediary device situated along a communication path between two endpoint devices may receive communication packets sent along the communication path. If the intermediary device receives a connection-initiating packet having a customization indicator and a connection-acknowledgement packet having a customization indicator, then the intermediary device may install a bypass rule.

24 Claims, 10 Drawing Sheets

ESTABLISHING TUNNELS BETWEEN SELECTIVE ENDPOINT DEVICES ALONG COMMUNICATION PATHS

TECHNICAL FIELD

This disclosure generally relates to network optimization.

BACKGROUND

In a network environment, there may be various types of network-enabled devices directly or indirectly connected to each other over the network. Different types of devices may implement different functions. For example, there may be any number of application servers, database servers, proxy servers, gateways, routers, switches, and clients all connected to the same network. When one device communicates with another device by, for example, sending communication or data packets to the other device over the network, often, the packets may go through a number of other, intermediary devices along the way before they reach their intended destination.

SUMMARY

This disclosure generally relates to network optimization.

In particular embodiments, a first computing device situated along a communication path between a second computing device and a third computing device may receive a first communication packet from the second computing device destined to the third computing device.

If the first communication packet is a connection-initiating packet having no customization indicator, then the first computing device may generate a second connection-initiating packet having a customization indicator and addressed to the third system; set a value of the customization indicator of the second connection-initiating packet to 0; and send the second connection-initiating packet to the third system.

If the first communication packet is a connection-initiating packet having a customization indicator with a value of 0, then first computing device may generate a third connection-initiating packet having a customization indicator and addressed to the third system; set a value of the customization indicator of the third connection-initiating packet to 1; and send the third connection-initiating packet to the third system.

If the first communication packet is a connection-initiating packet having a customization indicator with a value of 1, then first computing device may generate a first connection-acknowledgement packet having a customization indicator and addressed to the second system; set a value of the customization indicator of the first connection-acknowledgement packet to 1; and send the first connection-acknowledgement packet to the second system.

If the first communication packet is a connection-acknowledgement packet having no customization indicator, then first computing device may install an intercept rule; generate a second connection-acknowledgement packet having a customization indicator and addressed to the second system; set a value of the customization indicator of the second connection-acknowledgement packet to 1; and send the second connection-acknowledgement packet to the second system.

If the first communication packet is a connection-acknowledgement packet having a customization indicator with a value of 1, then first computing device may install a bypass rule.

These and other features, aspects, and advantages of the disclosure are described in more detail below in the detailed description and in conjunction with the following figures.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In a network environment, and more specifically, in an Application Delivery Network, there may be any number of intermediary network devices situated along a communication path in between two endpoint network devices (e.g., a client and a server). In particular embodiments, the intermediary devices may implement and support wide area network (WAN) optimization. Particular embodiments may dynamically discover the intermediary devices along a communication path between two endpoint devices and establish a transparent tunnel (e.g., a tunnel linking a branch device and a concentrator device) while bypassing some of these intermediary devices.

Various types of network-enabled devices, such as, for example and without limitation, servers, clients, routers, switches, gateways, proxies, etc., may be connected, directly or indirectly, to a computer network. These devices may communicate with each other over the network using various suitable communication or network protocols, examples of which may include Transmission Control Protocol (TCP) and Internet Protocol (IP). For example, one device may send communication or data packets to another device over a TCP network connection.

Figure 1:
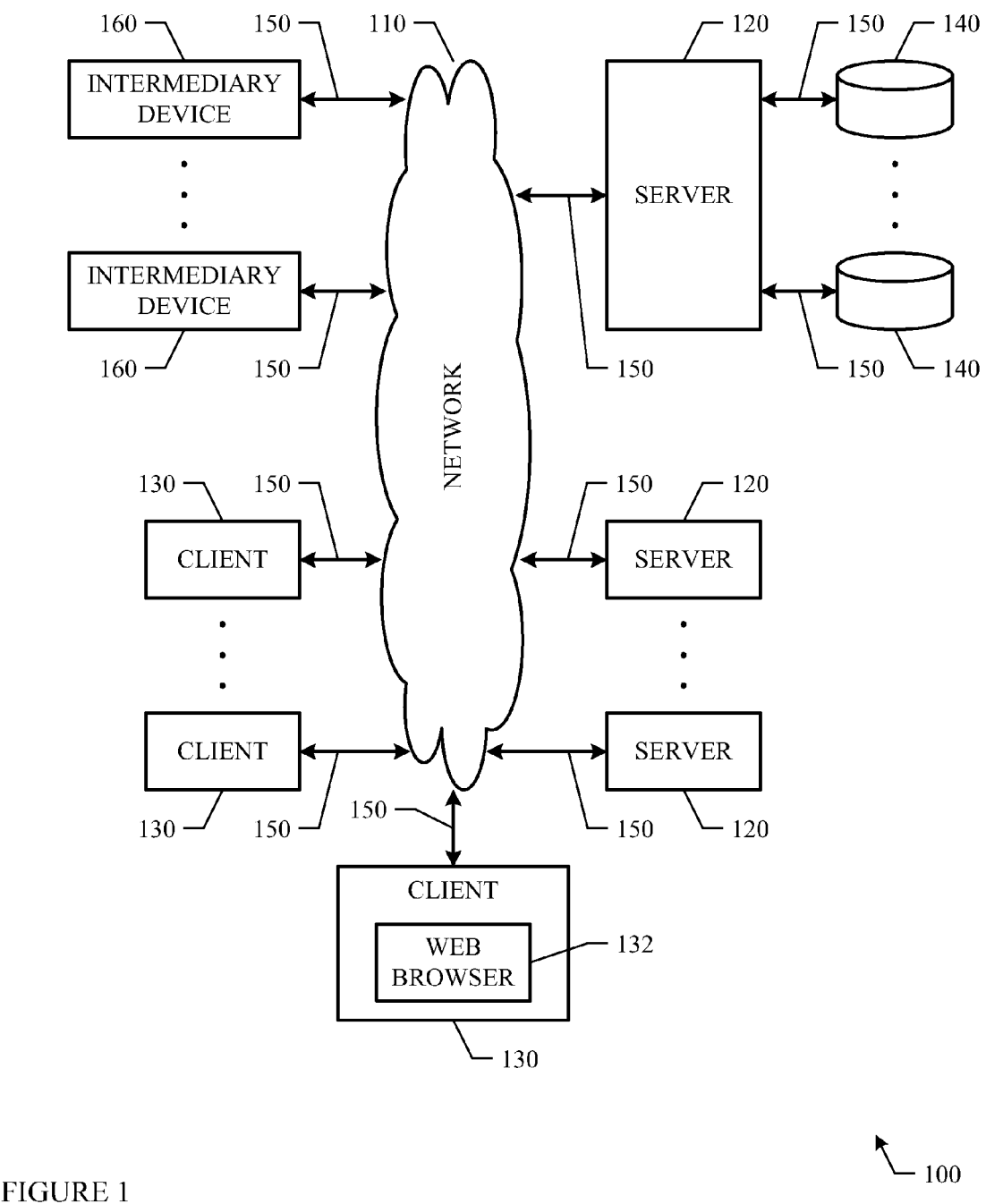
FIG. 1 illustrates an example network environment.

FIG. 1 illustrates an example network environment 100. Network environment 100 includes a network 110 coupling any number of servers 120, clients 130, and intermediary devices 160 to each other. In particular embodiments, network 110 may be an intranet, an extranet, a virtual private network (VPN), a local area network (LAN), a wireless LAN (WLAN), a wide area network (WAN), a metropolitan area network (MAN), a portion of the Internet, or another network 110 or a combination of two or more such networks 110. This disclosure contemplates any suitable network 110.

One or more links 150 may couple a server 120, a client 130, or an intermediary device 160 to network 110. In particular embodiments, one or more links 150 each includes one or more wire-line, wireless, or optical links 150. In particular embodiments, one or more links 150 each includes an intranet, an extranet, a VPN, a LAN, a WLAN, a WAN, a MAN, a portion of the Internet, or another link 150 or a combination of two or more links 150. This disclosure contemplates any suitable links 150 coupling servers 120 and clients 130 to network 110.

In particular embodiments, each server 120 may be a unitary server or may be a distributed server spanning multiple computers or multiple datacenters. Servers 120 may be of various types, such as, for example and without limitation, web server, news server, mail server, message server, advertising server, file server, application server, exchange server, database server, or proxy server. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML (Hypertext Markup Language) files or other file types, or may dynamically create or constitute files upon a request, and communicate them to clients 130 in response to HTTP (Hypertext Transfer Protocol) or other requests from clients 130. A mail server is generally capable of providing electronic mail services to various clients 130. A database server is generally capable of providing an interface for managing data stored in one or more data stores. An original content server (OCS) may be capable of providing various types of contents to various clients 130.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiments, each data storage 140 may be a relational database. Particular embodiments may provide interfaces that enable servers 120 or clients 130 to manage, e.g., retrieve, modify, add, or delete, the information stored in data storage 140.

In particular embodiments, each intermediary device 160 may be a computing or electronic device capable of implementing specific functionalities. Different intermediary devices 160 may implement different functionalities. For example and without limitation, intermediary device 160 may be router, switch, proxy, or gateway. Each intermediary device 160 may include hardware, software, or embedded logic components or a combination of two or more such components capable of carrying out the appropriate functionalities implemented or supported by intermediary device 160.

In particular embodiments, intermediary device 160 may be a ProxySG appliance made by Blue Coat Systems, Inc. based in Sunnyvale, Calif. The Blue Coat ProxySG appliances support secure web gateway and WAN optimization features. The Blue Coat WAN optimization (WAN-op) technologies are capable of accelerating the delivery of internal, external, and latency-sensitive real-time applications to distributed users across the extended enterprise, resulting in faster decision making and enhanced competitiveness. More specifically, the Blue Coat WAN optimization technologies are capable of accelerating critical applications by optimizing traffic, conserving bandwidth, and metering or blocking recreational applications. For example, the Blue Coat WAN optimization technologies may include HTTP optimization and caching as well as SSL (Secure Sockets Layer) or TLS (Transport Layer Security) acceleration.

In particular embodiments, each client 130 may be an electronic device including hardware, software, or embedded logic components or a combination of two or more such components and capable of carrying out the appropriate functionalities implemented or supported by client 130. For example and without limitation, a client 130 may be a desktop computer system, a notebook computer system, a netbook computer system, a handheld electronic device, or a mobile telephone. This disclosure contemplates any suitable clients 130. A client 130 may enable a network user at client 130 to access network 130. A client 130 may enable its user to communicate with other users at other clients 130.

A client 130 may have a web browser 132, such as MICROSOFT INTERNET EXPLORER, GOOGLE CHROME, MOZILLA FIREFOX, or APPLE SAFARI, and may have one or more add-ons, plug-ins, or other extensions, such as TOOLBAR or YAHOO TOOLBAR. A user at client 130 may enter a Uniform Resource Locator (URL) or other address directing the web browser 132 to a server 120, and the web browser 132 may generate a Hyper Text Transfer Protocol (HTTP) request and communicate the HTTP request to server 120. Server 120 may accept the HTTP request and communicate to client 130 one or more Hyper Text Markup Language (HTML) files responsive to the HTTP request. Client 130 may render a web page based on the HTML files from server 120 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, network environment 100 may be an Application Delivery Network (ADN). In particular embodiments, an ADN is a suite of technologies that, when deployed together, provide application availability, security, visibility, and acceleration. It may be considered as a combination of WAN optimization and Application Delivery Controllers (ADCs). In some cases, at the data-center end of an ADN is the Application Delivery Controller (ADC), which may be an advanced traffic management device that is often referred to as a web switch, content switch, or multilayer switch, the purpose of which is to distribute traffic among a number of servers (e.g., backend or application servers) or geographically dislocated sites based on application specific criterion. In the branch office portion of an ADN is the WAN optimization controller, which uses objectless caching techniques to reduce the number of bits that flow over the WAN, and shapes TCP (Transmission Control Protocol) traffic using prioritization and other optimization techniques. In particular embodiments, network environment 100 may implement an ADN infrastructure developed by Blue Coat Systems, Inc., which is capable of providing comprehensive application-and-user control required to reduce network bandwidth costs and enhance business productivity, while providing the flexibility to align network investments with changing business requirements.

In particular embodiments, the various types of devices (e.g., servers 120, clients 130, intermediary devices 160) connected to network 110 may communicate using various types of network or communication protocols, and this disclosure contemplates any suitable network or communication protocol. Examples of the protocols may include, without limitation, File Transfer Protocol (FTP), Common Internet File System (CIFS), Messaging Application Programming Interface (MAPI), Real Time Streaming Protocol, SOCKS, and Transmission Control Protocol (TCP)/Internet Protocol (IP).

In a network environment (e.g., network environment 100), the client-server model is a distributed application structure that partitions tasks or workloads between the providers of a resource or service, called servers (e.g., servers 120), and resource or service requesters, called clients (e.g., clients 130). The clients and servers may communicate with each other over the network. For example, when a client needs a service, it may send a service request to a server over the network. The server, upon receiving the service request, may send the result of the service (e.g., information or data) back to the client, again over the network.

In practice however, a client and a server often are not directly connected. Instead, there may be other network devices along the communication path between the client and the server. Communication packets (e.g., service requests or results) sent between the client and the server may need to go through a number of other network devices, which relay the packets. This may often be the case with other types of network devices as well. Thus, when a first network device sends communication packets to a second network device over a network, there may be any number of other network devices along the communication path between the first and second network devices, which relay the packets.

Figure 2:
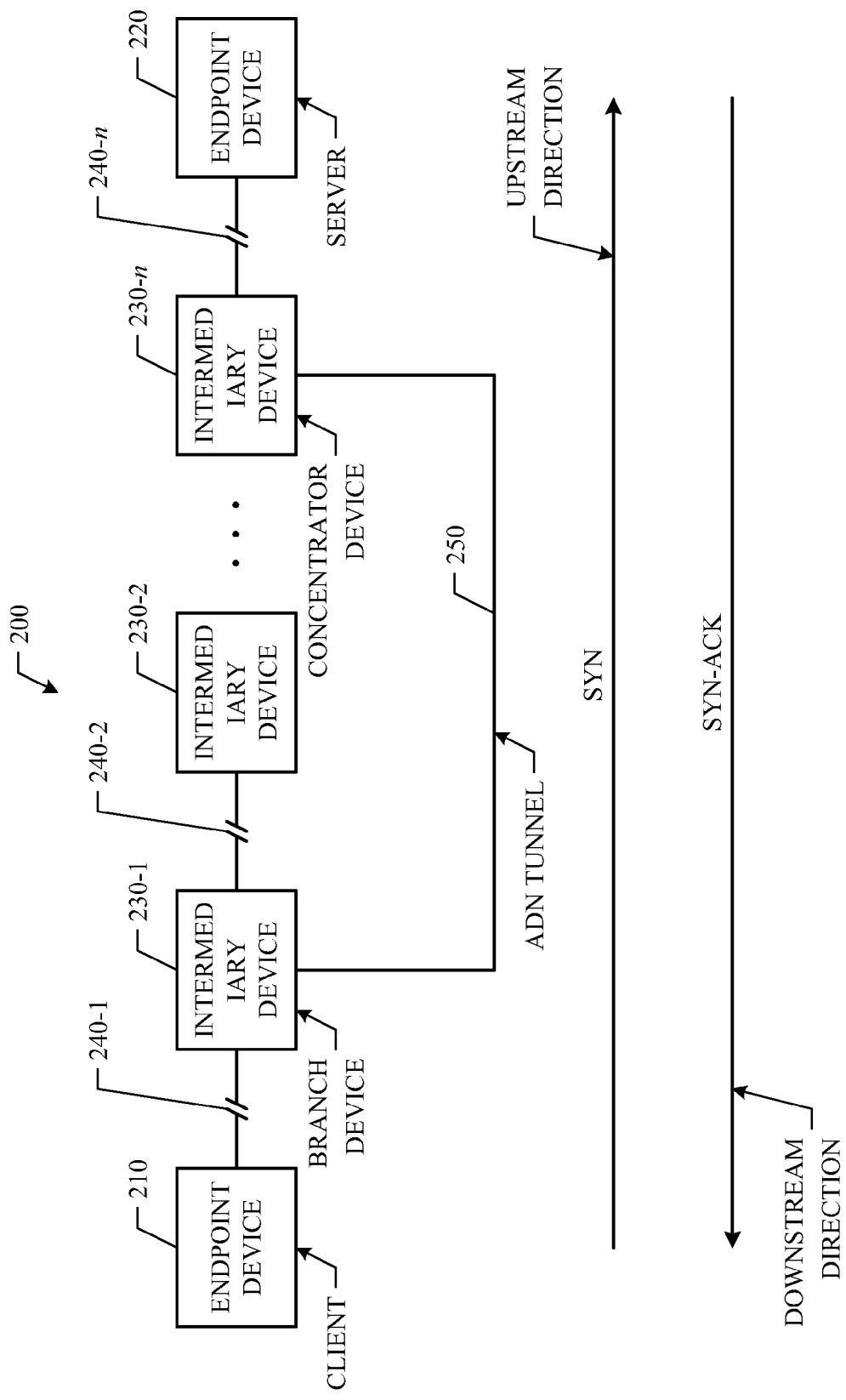
FIG. 2 illustrates an example communication path between two network devices.

FIG. 2 illustrates an example communication path 200 between two network devices 210 and 220. For example, device 210 may be a client, and device 220 may be a server. There may be any number of other network devices 230 along communication path 200, in between devices 210 and 220. For example, each device 230 may be a network appliance supporting WAN optimization (e.g., the Blue Coat ProxySG appliance). For clarification purposes, hereafter, devices 210 and 220 are referred to as "endpoint" devices, since they are situated at the two ends of communication path 200. Devices 230 are referred to as "intermediary" devices, since they are situated in the middle of communication path 200 and relay the communication packets sent between endpoint devices 210 and 220. Note that a specific network device may be an endpoint device along one communication path and an intermediary device along another, different communication path. Thus, whether a device is considered an endpoint or an intermediary device is with respect to a specific communication path.

In particular embodiments, two devices 210, 220, or 230 along communication path 200 may be connected by a network connection 240. In particular embodiments, connections 240 between network devices 210, 220, and 230 may be TCP connections. For example, suppose that endpoint device 210 (e.g., a client) wishes to establish a communication connection with endpoint device 220 (e.g., a server) in order to request and receive services provided by endpoint device 220. To establish a TCP connection 240 with endpoint device 220, endpoint device 210 may send a TCP SYN packet toward endpoint device 220 along communication path 200. In response, endpoint device 220 may send a TCP SYN-ACK packet back toward endpoint device 210 as an acknowledgement to the TCP SYN packet received from endpoint device 210. In this case, endpoint device 210 is the device requesting services, and endpoint device 220 is the device providing services. For clarification purposes, hereafter, the direction from an endpoint device that requests services (e.g., endpoint device 210) to an endpoint device that provides services (e.g., endpoint device 220) is referred to as the "upstream" direction; and the direction from the endpoint device that provides services (e.g., endpoint device 220) to the endpoint device that requests services (e.g., endpoint device 210) is referred to as the "downstream" direction. Note that along a communication path, either direction may be considered the upstream or downstream direction, depending on which endpoint device is requesting services and which endpoint device is providing services.

Communication packets sent between endpoint devices 210 and 220 need to pass through intermediary devices 230. For example, in the case illustrated in FIG. 2, when endpoint device 210 sends a packet upstream to endpoint device 220, the packet in turn passes through intermediary devices 230-1, 230-2, . . . , 230-n, and finally arrives at endpoint 220. Conversely, when endpoint device 220 sends a packet downstream to endpoint device 210, the packet in turn passes through intermediary devices 230-n, . . . , 230-2, 230-1, and finally arrives at endpoint 210.

In particular embodiments, communication path 200 may be a part of an ADN, and each intermediary device 230 may support WAN optimization. In this case, each intermediary device 230 is capable of optimizing the traffic flow over communication path 200 along which it situates. In the case illustrated in FIG. 2, intermediary device 230-1 is the first intermediary device to be reached by the communication traffic in the upstream direction from endpoint device 210 (e.g., client traffic), and thus may be referred to as the "branch" device. Intermediary device 230-n is the last intermediary device to be reached by the communication traffic in the upstream direction from endpoint device 210 before reaching endpoint 220, and thus may be referred to as the "concentrator" device. More specifically, in a client-server model, along a communication path between a client and a server, the branch device is the first intermediary device immediately after the client upstream along the communication path, and the concentrator device is the last intermediary device upstream immediately before the server along the communication path. Note that a specific intermediary device may be a branch device along a first communication path, a concentrator device along a second communication path, or neither a branch nor a concentrator device along a third communication path.

In particular embodiments, along a communication path, an ADN tunnel may be established between two intermediary devices. For example, in the case illustrated in FIG. 2, an ADN tunnel 250 may be established between the branch device (i.e., intermediary device 230-1) and the concentrator device (i.e., intermediary device 230-n). Communication traffic flows between endpoint devices 210 and 220 may be optimized inside ADN tunnel 250 by branch device 230-1 and concentrator device 230-n.

When there are other intermediary devices 230 (e.g., intermediary devices 230-2) situated in between branch device 230-1 and concentrator device 230-n along communication path 200, once a traffic flow has been optimized inside ADN tunnel 250, additional effort to further optimize the already optimized traffic flow brings no additional benefit while adding additional overhead. Therefore, particular embodiments may dynamically discover the number of intermediary devices 230 situated between two endpoint devices 210 and 220 and establish a transparent tunnel between the branch and concentrator devices (i.e., between intermediary devices 230-1 and 230-n), in order to bypass the other intermediary devices (e.g., intermediary device 230-2) in between them.

Figure 3:
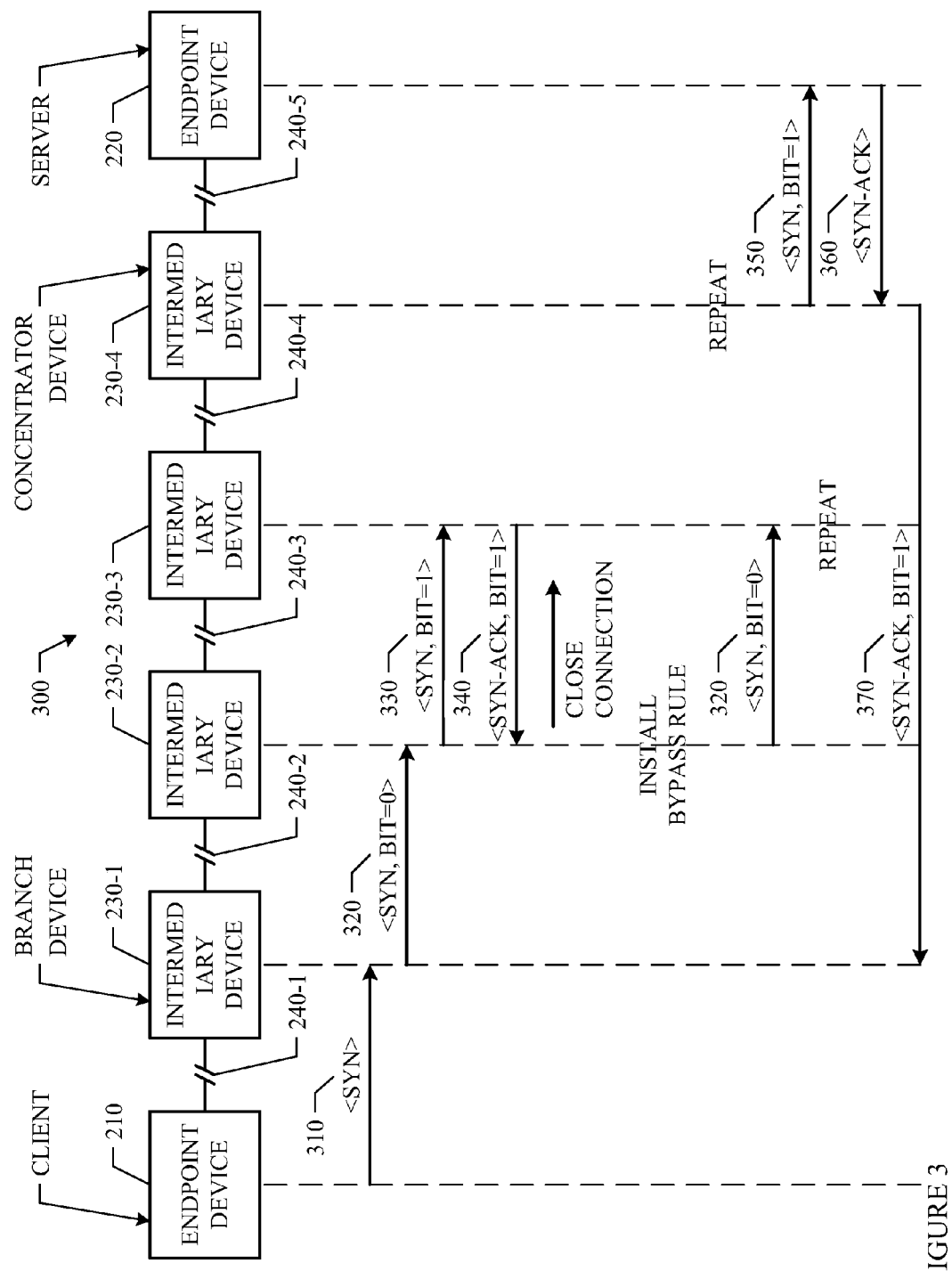
FIG. 3 illustrates an example process for establishing a tunnel between a branch device and a concentrator device along a communication path.
Figure 4A:
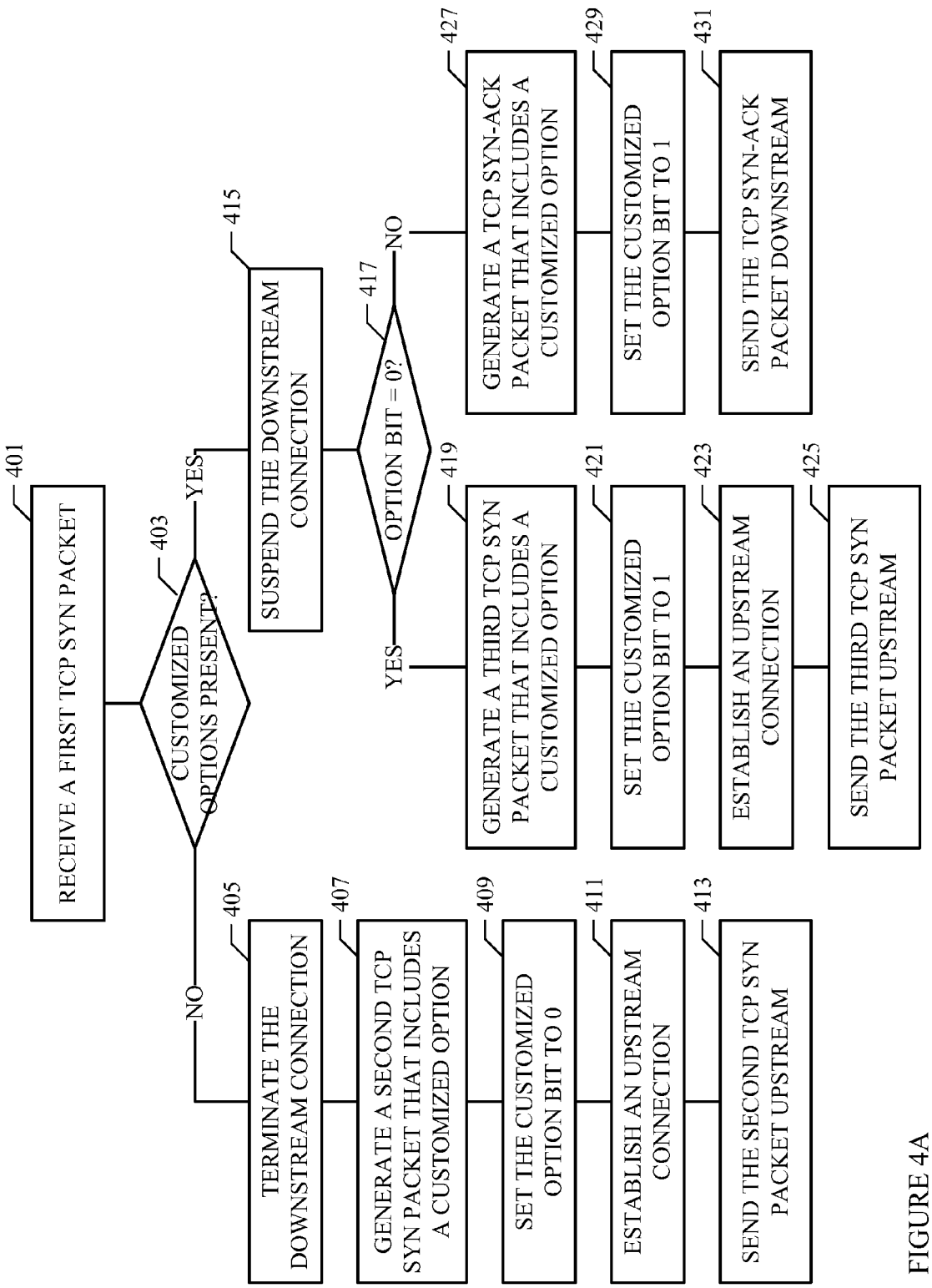
FIGS. 4A-4B illustrate an example method for establishing a tunnel between a branch device and a concentrator device along a communication path.
Figure 4B:
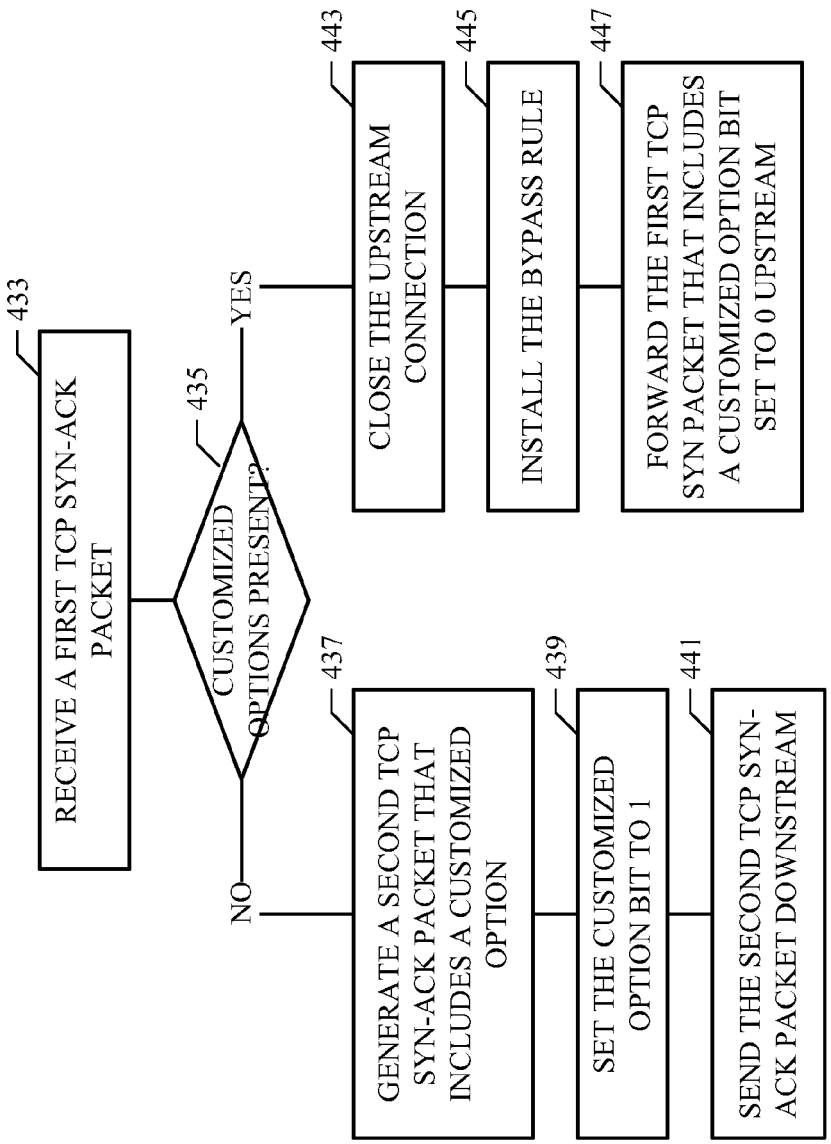

FIG. 3 illustrates an example process for establishing an ADN tunnel between a branch device and a concentrator device along a communication path 300. Note that only four intermediary devices 230-1 ... 230-4 are illustrated in FIG. 3 to simplify the discussion. In practice, there may be any number of intermediary devices situated between two endpoint devices along a communication path and the same process may be similarly applied regardless of the actual number of intermediary devices present. For example, in the case illustrated in FIG. 3, suppose that endpoint device 210 is a client and endpoint device 220 is a server. Client 210 requests services from server 220 and server 220 provides services to client 210. In this case, along communication path 300, intermediary device 230-1 is the branch device since it is the first intermediary device upstream after client 210; and intermediary device 230-4 is the concentrator device since it is the last intermediary device upstream before server 220. FIG. 4A-4B illustrate an example method for establishing a tunnel between a branch device and a concentrator device along a communication path. FIGS. 3 and 4A-4B are described together.

Suppose that client 210 wishes to establish a communication connection with server 220 in order to request and receive services from server 220. In particular embodiments, client 210 may send a connection-initiating packet upstream along communication path 300. More specifically, in particular embodiments, client 210 and server 220 may communication over TCP connections. In this case, client 210 may initiate a TCP connection 240-1 upstream along communication path 300 and send a TCP SYN packet 310 upstream over TCP connection 240-1.

Since SYN packet 310 is sent by client 210, it is a "standard" TCP SYN packet (i.e., it does not include any customized options). In the case illustrated in FIG. 3, intermediary device 230-1, being the first intermediary device upstream along communication path 300 immediately after client 210, may intercept SYN packet 310, as illustrated in STEP 401 of FIG. 4A. Intermediary device 230-1 may examine SYN packet 310 to determine that SYN packet 310 does not include any customized options (i.e., no customized option is present in packet 310), as illustrated in STEP 403—"NO" of FIG. 4A. Thus, intermediary device 230-1 may know that itself is the branch device for client 210 because there is no other intermediary device between itself and client 210 to customize SYN packet 310 (i.e., no customized options used in packet 310).

In practice, a branch device may reside in a branch office of an ADN. As a result, each branch device is usually aware that itself is a branch device. However, by examining whether a SYN packet received at an intermediary device includes any customized options, the intermediary device may also dynamically determine whether itself is in fact a branch device.

In particular embodiments, branch device 230-1 may terminate connection 240-1 (i.e., its downstream connection) with client 210, as illustrated in STEP 405 of FIG. 4A. That is, branch device 230-1 may successfully complete connection 240-1 with client 210 so that further exchange of communication packets may take place on connection 240-1. Branch device 230-1 may generate a new packet 320. Packet 320 may be another TCP SYN packet but having a customized option, as illustrated in STEP 407 of FIG. 4A. In particular embodiments, the customized option in packet 320 may be a single bit or multiple bits. Branch device 230-1 may set the value of the option bit in packet 320 to 0, as illustrated in STEP 409 of FIG. 4A.

In the TCP header, there is an "options" field, which may be a space near the end of the TCP header and may be a multiple of 8 bits in length. A specific bit (e.g., identified by a specific offset value) may be reserved to be used as the customized option bit. In addition, there may be a maximum length defined for the "options" space in the TCP header. In particular embodiments, the size of the customized option is limited to be less than or equal to the maximum length of the "options" space in the TCP header.

In particular embodiments, branch device 230-1 may initiate a TCP connection 240-2 upstream along communication path 300, as illustrated in STEP 411 of FIG. 4A, and send packet 320 upstream over TCP connection 240-2, as illustrated in STEP 413 of FIG. 4A.

In the case illustrated in FIG. 3, intermediary device 230-2 is the next device upstream along communication path 300 after branch device 230-1. Thus, intermediary device 230-2 may intercept packet 320, as illustrated in STEP 401 of FIG. 4A. Again, intermediary device 230-2 may examine packet 320 to determine that, this time, packet 320 does include a customized option bit, as illustrated in STEP 403—"YES" of FIG. 4A. Intermediary device 230-2 may know that itself is not a branch device along communication path 300 because there is at least one other intermediary device downstream between itself and client 210 to customize packet 320 (i.e., packet 320 includes a customized option bit). Note that however, at this point, intermediary device 230-2 does not yet know whether itself is a concentrator device along communication path 300.

In particular embodiments, intermediary device 230-2 may suspend TCP connection 240-2 (i.e., its downstream connection) with branch device 230-1, and temporarily hold packet 320 received from branch device 230-1, as illustrated in STEP 415 of FIG. 4A. Suspending a TCP connection is known as "Delayed Intercept", and is described in more detail in U.S. Pat. No. 7,743,160 to Li et al., entitled "system and method of delaying connection acceptance to support connection request processing at layer-7", which is hereby incorporated by reference in its entirety and for all purposes.

Intermediary device 230-2 may examine packet 320 to determine that the value of the customized option bit in packet 320 is set to 0, as illustrated in STEP 417—"YES" of FIG. 4A. In particular embodiments, intermediary device 230-2 may generate a new packet 330. Again, packet 330 may be another TCP SYN packet having a customized option (e.g., a bit in the "options" space in the TCP header), as illustrated in STEP 419 of FIG. 4A, and set the value of the option bit in packet 330 to 1, as illustrated in STEP 421 of FIG. 4A. Note that in particular embodiments, for packet 320 generated by branch device 230-1, the value of the option bit in packet 320 is set to 0. In contrast, for packet 330 generated by intermediary device 230-2 (i.e., not the branch device), the value of the option bit in packet 330 is set to 1.

In particular embodiments, intermediary device 230-2 may initiate a TCP connection 240-3 upstream along communication path 300, as illustrated in STEP 423 of FIG. 4A, and send packet 330 upstream over TCP connection 240-3, as illustrated in STEP 425 of FIG. 4A.

In the case illustrated in FIG. 3, intermediary device 230-3 is the next device upstream along communication path 300 after intermediary device 230-2. Thus, intermediary device 230-3 may intercept packet 330, as illustrated in STEP 401 of FIG. 4A. Intermediary device 230-3 may examine packet 330 to determine that packet 330 includes a customized option bit, as illustrated in STEP 403—"YES" of FIG. 4A. Similarly, intermediary device 230-3 may know that itself is not a branch device along communication path 300 because there is at least one other intermediary device downstream between itself and client 210 to customize packet 330 (i.e., packet 330 includes a customized option bit). Note that however, at this point, intermediary device 230-3 does not yet know whether itself is a concentrator device along communication path 300.

In particular embodiments, intermediary device 230-3 may examine packet 330 to determine that the value of the option bit in packet 330 is set to 1, as illustrated in STEP 417—"NO" of FIG. 4A. Since the value of the option bit in packet 330 is set to 1, intermediary device 230-3 may determine that intermediary device 230-2, which is the device that has generated and sent packet 330, is not a branch device for communication path 300. Recall that for packet 320 generated and sent by branch device 230-1, the value of the option bit in packet 320 is set to 0. Furthermore, since intermediary device 230-3 itself is situated upstream between intermediary device 230-2 and sever 220, intermediary device 230-3 may also determine that intermediary device 230-2 is also not a concentrator device for communication path 300. In other words, along communication path 300, intermediary device 230-2 is situated in between the branch and concentrator devices, and therefore may be bypassed.

In particular embodiments, in response to packet 330, intermediary device 230-3 may generate a new connection-acknowledgement packet 340. More specifically, in particular embodiments, packet 340 may be a TCP SYN-ACK packet having a customized option (e.g., a reserved bit in the "options" space in the TCP header), as illustrated in STEP 427 of FIG. 4A. and set the value of the option bit in packet 340 to 1, as illustrated in STEP 429 of FIG. 4A. In particular embodiments, intermediary device 230-3 may send packet 340 downstream over TCP connection 240-3, as illustrated in STEP 431 of FIG. 4A.

In the case illustrated in FIG. 3, intermediary device 230-2 is the next device downstream along communication path 300 after intermediary device 230-3. Thus, intermediary device 230-2 may receive packet 340, which includes a SYN-ACK and a customized option bit set to 1, as illustrated in STEP 433 of FIG. 4B. Intermediary device 230-2 may examine packet 340 to determine that packet 340 includes a customized option bit (i.e., customized option is present in packet 340), as illustrated in STEP 435—"YES" of FIG. 4B. Intermediary device 230-2 may know that itself is not a concentrator device along communication path 300 because there is at least one other intermediary device upstream between itself and server 220 to customize packet 340 (i.e., packet 340 includes a customized option bit). Recall that previously, intermediary device 230-2 has already determined that itself is not a branch device along communication path 300. At this point, intermediary device 230-2 is aware that itself is situated in between the branch and concentrator device along communication path 300 and may be bypassed.

In particular embodiments, intermediary device 230-2 may close TCP connection 240-3 (i.e., its upstream connection with intermediary device 230-3), as illustrated in STEP 443 of FIG. 4B. For example, TCP connection 240-3 may be closed by performing a connection close or by resetting the connection. In particular embodiments, intermediary device 230-2 may install a connection bypass rule, illustrated in STEP 445 of FIG. 4B, so that any communication packets sent along communication path 300, in either upstream or downstream direction, between device 210 and device 220, are merely forwarded onward without any processing being performed by intermediary device 230-2. The bypass rule is described in more detail below.

Recall that when first receiving packet 320 from branch device 230-1, intermediary device 230-2 temporarily holds packet 320. At this point, intermediary device 230-2 may forward the original packet 320 upstream along communication path 300, as illustrated in STEP 447 of FIG. 4B.

In the case illustrated in FIG. 3, intermediary device 230-3 is the next device upstream after intermediary device 230-2, and may receive packet 320 originally generated by branch device 230-1. In particular embodiments, the steps described above with respect to intermediary device 230-2 and illustrated in FIGS. 4A and 4B may be repeated with respect to intermediary device 230-3. Since intermediary device 230-3 is neither the branch nor the concentrator device along communication path 300, similar to intermediary device 230-2, intermediary device 230-3 may also install the bypass rule and then forward the packet 320 originally generated by branch device 230-1 upstream along communication path 300.

In the case illustrated in FIG. 3, intermediary device 230-4 is the next device upstream along communication path 300 after intermediary device 230-3, and may receive packet 320 originally generated by branch device 230-1, as illustrated in STEP 401 of FIG. 4A. In particular embodiments, by examining packet 320, intermediary device 230-4 may determine that there is a customized option bit included in packet 320, as illustrated in STEP 403—"YES" of FIG. 4A, and the value of the option bit is set to 0, as illustrated in STEP 417—"YES)" of FIG. 4A. Intermediary device 230-4 may similarly determine that itself is not the branch device along communication path 300 because packet 320 includes both a SYN and a customized option bit. In particular embodiments, intermediary device 230-4 may similarly perform STEPS 415, 419, 421, 423, and 425 of FIG. 4A as described above. In particular embodiments, after intermediary device 230-4 has generated and sent a new packet 350 (e.g., a TCP SYN packet having a customization option bit with its value set to 1) upstream, packet 350 is received by server 220, since server 220 is the next device upstream along communication path 300 after intermediary device 230-4.

Server 220 is not aware of the purpose of the customized option bit in packet 350 and thus may ignore it. Instead, server 220 may examine packet 350 to determine that there is a SYN included in packet 350. In response, server 220 may generate a TCP SYN-ACK packet 360 and send it downstream back to intermediary device 230-4. Since SYN-ACK packet 360 is generated by server 220, it does not include any customized options (e.g., it does not include a customized option bit).

In particular embodiments, upon receiving SYN-ACK packet 360 from server 220, as illustrated in STEP 433 of FIG. 4B, intermediary device 230-4 may examine SYN-ACK packet 360 to determine that SYN-ACK packet 360 does not include any customized options, as illustrated in STEP 435—"NO" of FIG. 4B. Consequently, intermediary device 230-4 may know that itself is the concentrator device for server 220 because there is no other intermediary device between itself and server 220 to customize SYN-ACK packet 360 (i.e., no customized options used in packet 360).

In particular embodiments, concentrator device 230-4 may generate a new packet 370 that includes a SYN-ACK and a customized option bit, as illustrated in STEP 437 of FIG. 4B, and set the value of the option bit in packet 370 to 1, as illustrated in STEP 439 of FIG. 4B. Concentrator device 230-4 may send packet 370 downstream along communication path 300.

At this point, intermediary devices 230-2 and 230-3 along communication path 300, which are neither the branch nor the concentrator device, have already installed the connection bypass rule. Thus, packet 370 is relayed by intermediary devices 230-2 and 230-3 to branch device 230-1. Upon receiving packet 370 by branch device 230-1, which includes a SYN-ACK, an ADN tunnel is established between branch device 230-1 and concentrator device 230-4, bypassing intermediary devices 230-2 and 230-3. Normal ADN processing may then begin for the communication flows along communication path 300.

To briefly summarize the process described above, along a specific communication path, when an intermediary device receives a SYN packet that does not include any customized options, the intermediary device is considered the branch device for the communication path. When an intermediary device receives a SYN-ACK packet that does not include any customized options, the intermediary device is considered the concentrator device for the communication path. When an intermediary device receives a packet that includes a SYN and a customized option (e.g., an option bit), with the option bit set to 1, and a packet that includes a SYN-ACK and a customized option (e.g., an option bit), with the option bit set to 1, the intermediary device is considered to be situated in between the branch and the concentrator device and may be bypassed. In particular embodiments, such an intermediary device may install a bypass rule (e.g., a connection bypass rule).

In the process described above in connection with FIGS. 3 and 4A-4B, the customized option included in a packet is implemented as a single bit. Alternatively, in particular embodiments, the customized option included in a packet may be a counter, also referred to as a "hop" counter. In this case, a number of bits in the "options" space in the TCP header may be reserved for the counter.

Figure 5:
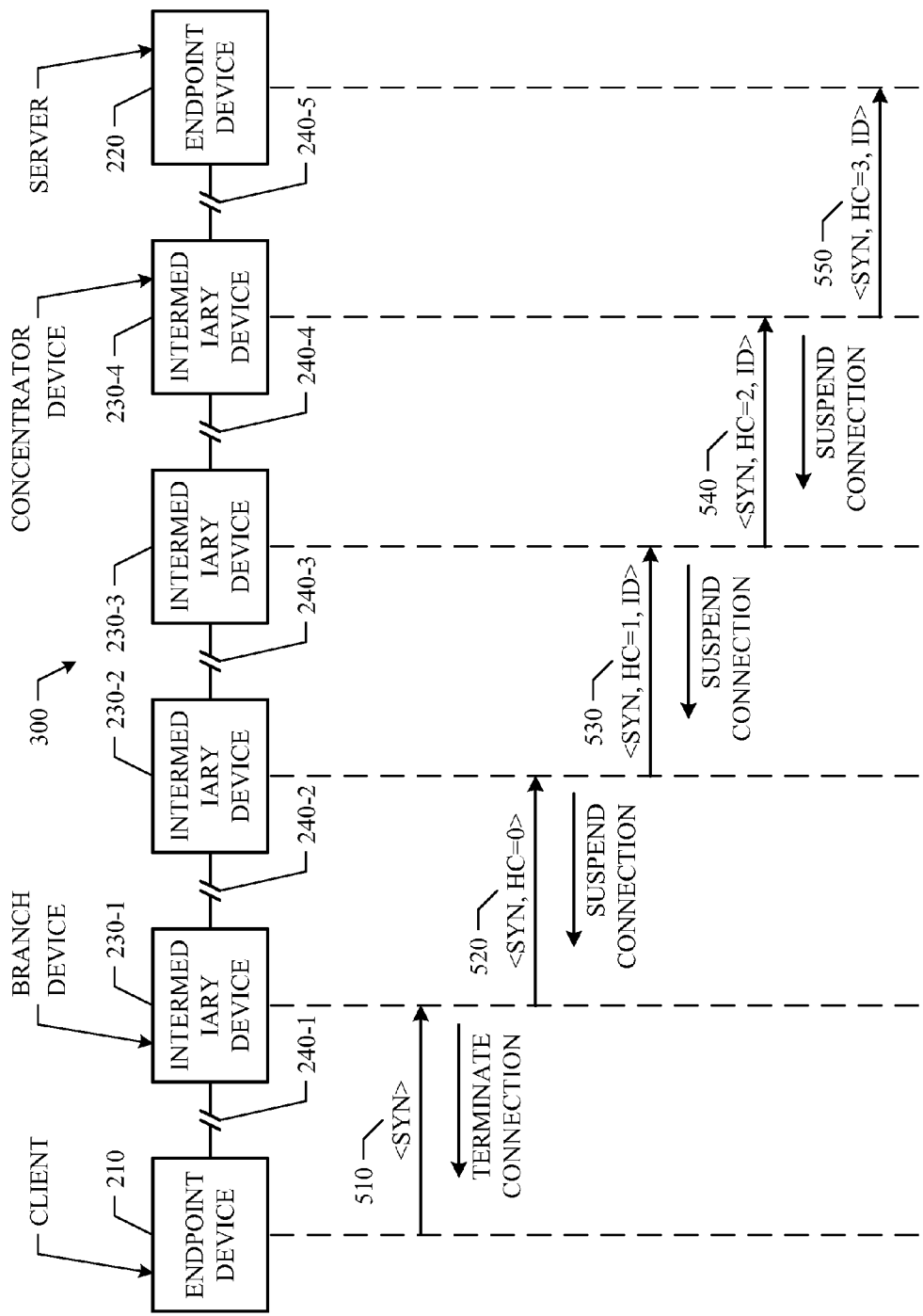
FIG. 5 illustrates an example process for discovering the number of intermediary devices situated in between two endpoint devices.

FIG. 5 illustrates an example process for dynamically discovering the number of intermediary devices 230 situated in between two endpoint devices 210 and 220 along communication path 300, while dynamically establishing a transparent ADN tunnel during the same process. For example, endpoint device 210 may be a client and endpoint device 220 may be a server. Client 210 may request services from server 220, and server 220 may provide services to client 210. Again, note that only four intermediary devices 230-1 . . . 230-4 are illustrated in FIG. 5 to simplify the discussion. In practice, there may be any number of intermediary devices situated between two endpoint devices along a communication path and the same process may be similarly applied regardless of the actual number of intermediary devices present.

Suppose that client 210 wishes to establish a communication connection with server 220. In particular embodiments, client 210 may initiate a TCP connection 240-1 upstream and send a TCP SYN packet 510 upstream over TCP connection 240-1.

In the case illustrated in FIG. 5, intermediary device 230-1 is the first intermediary device upstream along communication path 300 immediately after client 210. Thus, SYN packet 510 first reaches intermediary device 230-1. Since SYN packet 510 is sent by client 210, it is a standard SYN packet (e.g., only including a TCP SYN and not including any customized options). In particular embodiments, intermediary device 230-1, upon receiving SYN packet 510, may determine that itself is the first intermediary device upstream after client 210 along communication path 300, because there is no customized option included in packet 510. This means that intermediary device 230-1 is in fact the branch device for client 210. Branch device 230-1 may terminate downstream TCP connection 240-1 with client 210, and initiate a TCP connection 240-2 upstream along communication path 300. In other words, branch device 230-1 may successfully complete connection 240-1 with client 210 so that further exchange of communication packets may take place on connection 240-1. In particular embodiments, branch device 230-1 may generate a new packet 520, which may be a SYN packet having a customization counter (e.g., a hop counter) and a device identifier that is unique to branch device 230-1. In particular embodiments, a number of bits in the "options" space in the TCP header may be reserved for this customization counter. Branch device 230-1 may set the value of the counter in packet 520 to 0 as it is the first intermediary device after client 210 upstream along communication path 300. In particular embodiments, branch device 230-1 may send packet 520 upstream over TCP connection 240-2.

In the case illustrated in FIG. 5, packet 520 first reaches intermediary device 230-2 after being sent by intermediary device 230-1. In particular embodiments, intermediary device 230-2, upon receiving packet 520, may determine that there is a counter in packet 520. This means that intermediary device 230-2 is not the branch device for client 210, because there is at least one other intermediary device downstream between itself and client 210 that has sent packet 520 including a customized counter. Furthermore, the value of the counter in packet 520 is 0, which means that packet 520 is generated and sent by the branch device (i.e., branch device 230-1) along communication path 300. Intermediary device 230-2 may temporarily hold packet 520.

Intermediary device 230-2 may suspend downstream TCP connection 240-2 with intermediary device 230-1 and initiate a TCP connection 240-3 upstream along communication path 300. Intermediary device 230-2 may generate a new packet 530. In particular embodiments, packet 530 may be a TCP SYN packet having a counter and an identifier (ID). In particular embodiments, a number of bits may be reserved in the "option" space of the TCP header for the counter and the ID. Intermediary device 230-2 may set the value of the counter in packet 530 to 1 by incrementing the value of the counter in packet 520 (i.e., 0). Each intermediary device 230 may have a unique peer ID (e.g., the birth certificate or Media Access Control (MAC) address), and the ID in packet 530 may be the unique peer ID of branch device 230-1. In particular embodiments, intermediary device 230-2 may send packet 530 upstream over TCP connection 240-3.

In the case illustrated in FIG. 5, packet 530 first reaches intermediary device 230-3 after being sent by intermediary device 230-2. In particular embodiments, intermediary device 230-3, upon receiving packet 530, may determine that there is a counter in packet 530. Intermediary device 230-3 may suspend downstream TCP connection 240-3 with intermediary device 230-2 and initiate a TCP connection 240-4 upstream along communication path 300. Intermediary device 230-3 may generate a new packet 540. In particular embodiments, packet 540 may be a TCP SYN packet having a counter and an ID. Intermediary device 230-3 may set the value of the counter in packet 540 to 2 by incrementing the value of the counter in packet 530 (i.e., 1). The ID in packet 540 may be the peer ID of branch device 230-1. In particular embodiments, intermediary device 230-3 may send packet 540 upstream over TCP connection 240-4.

In the case illustrated in FIG. 5, packet 540 first reaches intermediary device 230-4 after being sent by intermediary device 230-3. In particular embodiments, intermediary device 230-4, upon receiving packet 540, may determine that there is a counter in packet 540. Intermediary device 230-4 may suspend downstream TCP connection 240-4 with intermediary device 230-3 and initiate a TCP connection 240-5 upstream along communication path 300. Intermediary device 230-4 may generate a new packet 550. In particular embodiments, packet 550 may be a TCP SYN packet having a counter and an ID. Intermediary device 230-4 may set the value of the counter in packet 550 to 3 by incrementing the value of the counter in packet 540 (i.e., 2). The ID in packet 550 may be the peer ID of branch device 230-1. In particular embodiments, intermediary device 230-4 may send packet 550 upstream over TCP connection 240-5.

In the case illustrated in FIG. 5, intermediary device 230-4 is the last intermediary device upstream immediately before server 220. Thus, packet 550 reaches server 220. In particular embodiments, packet 520 (i.e., the packet generated by branch device 230-1 and having counter value 0) contains the peer ID of branch device 230-1, while packets 530, 540, and 550 (i.e., the packets having counter values greater than 0) each propagate the peer ID of branch device 230-1.

Using the counter contained in each packet 520, 530, 540, and 550, particular embodiments may dynamically discover the total number of intermediary devices 230 situated in between two endpoint devices 210 and 220. In the case illustrated in FIG. 5, there are a total of four intermediary devices 230 in between endpoint devices 210 and 220 (e.g., determined by adding 1 to the counter value contained in the last packet 550). In some cases, this information may be used to diagnose or manage communication path 300.

Figure 6:
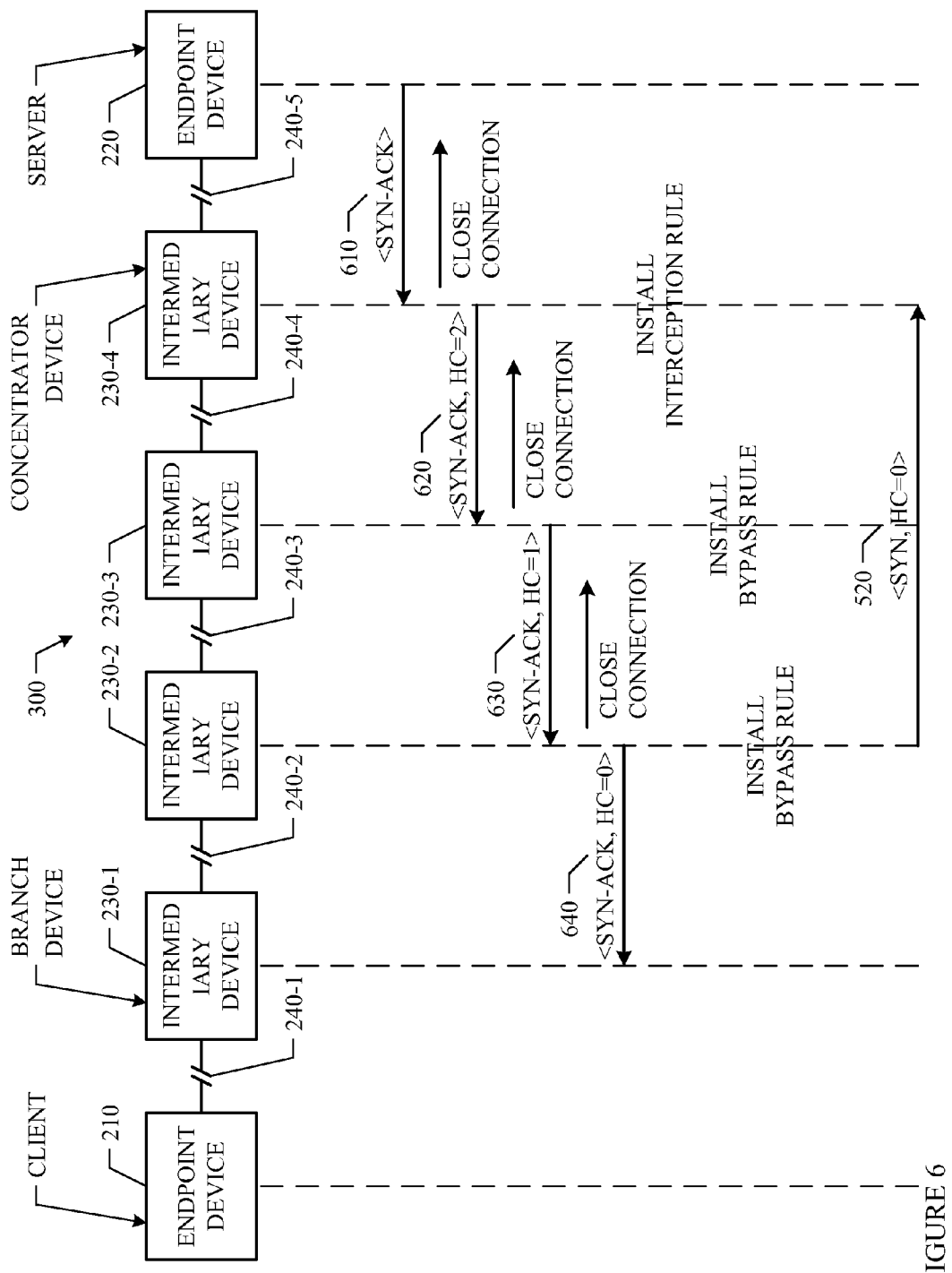
FIG. 6 illustrates an example process for establishing a tunnel in order to bypass some of the intermediary devices situated in between two endpoint devices.

FIG. 6 illustrates an example process for establishing an ADN tunnel in order to bypass some of the intermediary devices (e.g., intermediary devices 230-2 and 230-3) situated in between two endpoint devices 210 and 220 along communication path 300. Again, only four intermediary devices 230 are illustrated in FIG. 6 to simplify the discussion. In practice, there may be any number of intermediary devices situated between two endpoint devices along a communication path and the same process may be similarly applied regardless of the actual number of intermediary devices present.

When server 220 receives packet 550 that includes a SYN, it may respond with a TCP SYN-ACK packet 610. Although packet 550 includes a customized counter, server 220 may ignore the counter in packet 550. In particular embodiments, server 220 may send SYN-ACK packet 610 downstream over TCP connection 240-5.

In the case illustrated in FIG. 6, intermediary device 230-4 is the first intermediary device downstream along communication path 300 immediately after server 220. Thus, SYN-ACK packet 610 first reaches intermediary device 230-4. Since SYN-ACK packet 610 is sent by server 220, it is a standard SYN-ACK packet (e.g., only including a TCP SYN-ACK and not including any customized options). In particular embodiments, intermediary device 230-4, upon receiving the standard SYN-ACK packet 610, may determine that itself is the first intermediary device that receives SYN-ACK packet 610 sent by server 220. This means that intermediary device 230-4 is in fact the last intermediary device upstream immediately before server 220, and thus is the concentrator device for server 220.

In particular embodiments, concentrator device 230-4 may close TCP connection 240-5 with server 220, which causes this local connection to be closed. In particular embodiments, because intermediary device 230-4 is the contractor device for server 220, it may install an "intercept" rule, which is described in more detail below. In particular embodiments, the intercept rule may cause an intermediary device to intercept communication packets sent between two endpoint devices (e.g., endpoint devices 210 and 220).

In particular embodiments, concentrator device 230-4 may generate a packet 620, which may be a TCP SYN-ACK packet having a customization counter (e.g., a hop counter) in the "options" space of the TCP header. The value of the counter may be set to 2, corresponding to the value of the counter included in packet 540 sent by intermediary device 230-3, as illustrated in FIG. 5, which is the intermediary device downstream along communication path 300 immediately after intermediary device 230-4. Intermediary device 230-4 may send packet 620 downstream over TCP connection 240-4.

In the case illustrated in FIG. 6, packet 620 first reaches intermediary device 230-3. Because packet 620 includes a counter having a value of 2, intermediary device 230-3 may determine that itself is not the last intermediary device upstream immediately before server 220 and there is at least one other intermediary device upstream between itself and server 220 along communication path 300. Thus, intermediary device 230-3 is not the concentrator device along communication path 300. Furthermore, it has been determined that intermediary device 230-3 is not the branch device along communication path 300.

In particular embodiments, intermediary device 230-3 may close TCP connection 240-4 with intermediary device 230-4, and install a "bypass" rule, which is described in more detail below. In particular embodiments, the bypass rule may cause an intermediary device to relay communication packets sent between two endpoint devices (e.g., endpoint devices 210 and 220) without performing any type of processing or optimization in connection with the communication packets.

In particular embodiments, intermediary device 230-3 may generate a packet 630, which may be another TCP SYN-ACK packet having a counter. The value of the counter may be set to 1, corresponding to the value of the counter included in packet 530 sent by intermediary device 230-2, as illustrated in FIG. 5. Intermediary device 230-3 may then send packet 630 downstream over TCP connection 240-3.

In the case illustrated in FIG. 6, packet 630 first reaches intermediary device 230-2. Because packet 630 includes a counter, intermediary device 230-2 may determine that itself is not the last intermediary device upstream immediately before server 220 and there is at least one other intermediary device upstream between itself and server 220 along the communication path. In particular embodiments, intermediary device 230-2 may close TCP connection 240-3 with intermediary device 230-3, and install a similar "bypass" rule. In particular embodiments, if intermediary device 230-2 were to generate a packet 640, which may be another TCP SYN-ACK having a counter, then the value of the counter would be set to 0, corresponding to the value of the counter included in packet 520 sent by branch device 230-1, as illustrated in FIG. 5. However, at this point, intermediary device 230-2 has already determined that it is one hop away from the branch device for client 210 (i.e., branch device 230-1). Therefore, in particular alternative embodiments, intermediary device 230-2 will not generate a packet 640.

As described above in connection with FIG. 5, branch device 230-1 generates packet 520 that includes a SYN and a counter with the value set to 0. Intermediary device 230-2, upon receiving packet 520, may temporarily hold packet 520. At this point, in particular embodiments, intermediary device 230-2 may forward packet 520 upstream to concentrator device 230-4. Because intermediary device 230-3 has already installed the bypass rule, intermediary device 230-3 may relay packet 520 upstream without processing it.

In particular embodiments, when the communication packets that include the TCP SYN are initiated upstream, each intermediary device 230 initiates a TCP connection 240 with the device upstream. When the communication packets that include the TCP SYN-ACK are responded downstream, each intermediary device 230, except the branch device, closes the TCP connection 240 with the device upstream. In particular embodiments, these TCP connections 240 may trigger state information, which may be retained at each in-path intermediary device 230. In particular embodiments, when the packet generated by the branch device (e.g., branch device 230-1) is forwarded upstream, the intermediate state information that may be used to identify this communication flow includes the peer ID of the branch device, the Internet Protocol (IP) address of the destination device, and the port of the destination device.

In particular embodiments, an intercept or bypass rule may include a 3-tuple rule, which may include the peer ID of the branch device, the IP address of the destination device, and the port of the destination device. In particular embodiments, the 3-tuple rule may be installed into the firewall rule set of each intermediary device (e.g., intermediary device 230). For clarification purposes, this 3-tuple rule may be referred to as the "level-1" rule.

In addition, in particular embodiments, an intercept or bypass rule may further include a 4-tuple rule, which may include the IP address of the source device, the port of the source device, the IP address of the destination device, and the port of the destination device. In particular embodiments, the 4-tuple may be installed into the connection table of each intermediary device 230. For clarification purposes, this may be referred to as the "level-2" rule. In particular embodiments, the level-2 4-tuple rule may be dynamically generated based on the level-1 3-tuple rule at each intermediary device.

A specific intermediary device may be situated along multiple communication paths. The intermediary device may be the branch device along a first path, the concentrator device along a second path, and neither the branch nor the concentrator device along a third path. Thus, for some of these communication paths, the intermediary device may have corresponding intercept rules, and for others, the intermediary device may have corresponding bypass rules. In particular embodiments, each intermediary device may maintain a connection table, where each entry in the table corresponds to a bypass or intercept rule for a specific communication path. In particular embodiments, the 4-tuple intercept or bypass rules may be installed in the connection table.

Figure 7:
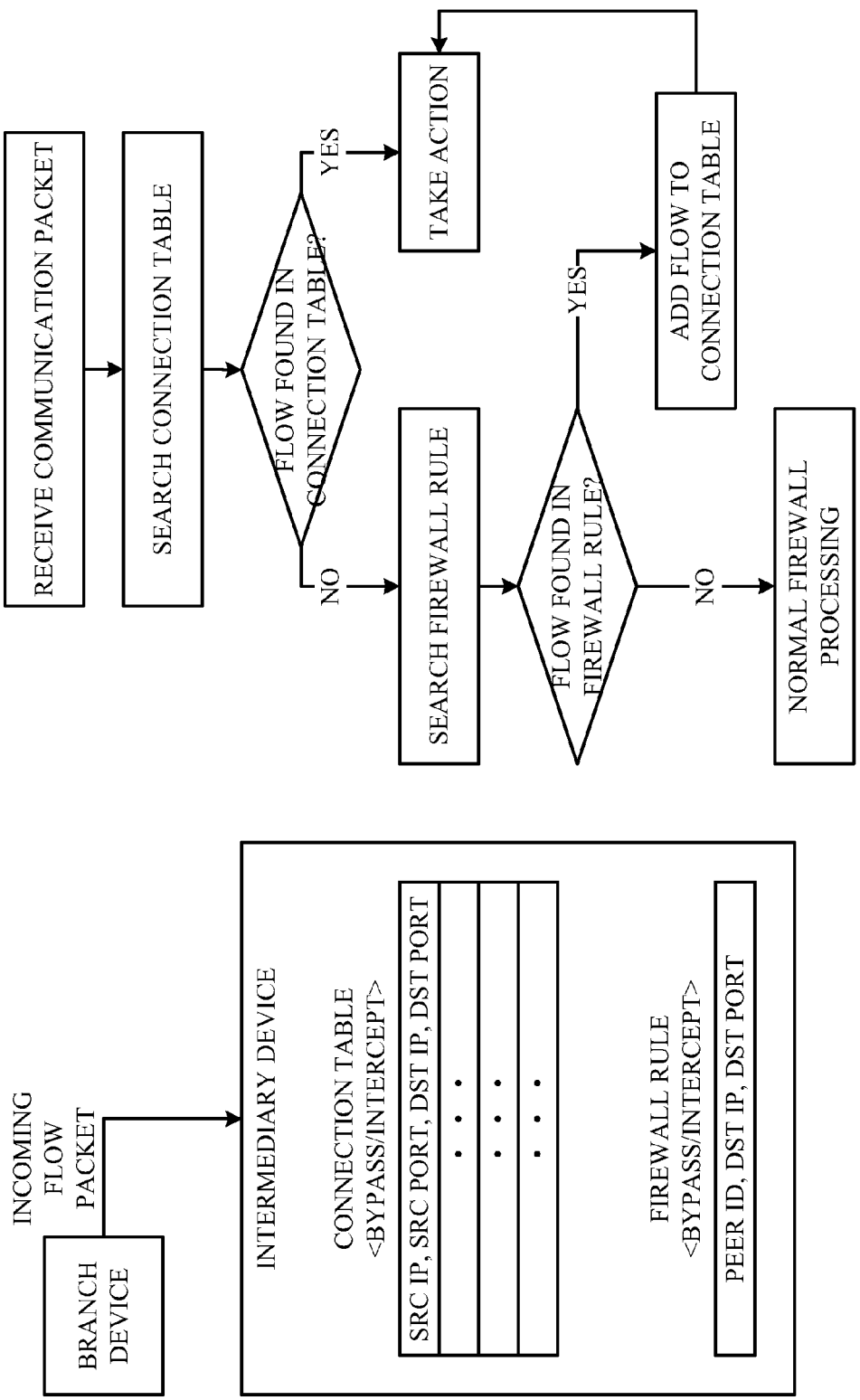
FIG. 7 illustrates an example process for selecting an action in response to an incoming traffic flow.

When a specific traffic flow comes from the branch device to an intermediary device, the existing connection table maintained by the intermediary device is searched first for the incoming flow. If the flow is present in the connection table (e.g., the source and destination IP addresses and port numbers of the flow match a 4-tuple entry in the connection table), then the associated action (e.g., intercept or bypass) is executed. Otherwise, a second search in the firewall rule set is performed. If a match is found against a 3-tuple entry (e.g., the peer ID of the branch device and the destination IP address and port number of the flow match a 3-tuple entry), then a corresponding new flow is added to the connection table. To do so, in particular embodiments, a new 4-tuple rule is dynamically generated based on the matching 3-tuple entry, and the new 4-tuple entry is added to the connection table. The associated action (e.g., intercept or bypass) is then executed. On the other hand, if no match to any 3-tuple entry is found in the firewall rule, then the normal (e.g., standard) firewall rule processing may be performed on the incoming flow. This process is illustrated in FIG. 7.

Classifying packet flows is described in more detail in U.S. Publication 2008/0077705 to Li et al., entitled "system and method of traffic inspection and classification for purposes of implementing session ND content control"", which is hereby incorporated by reference in its entirety and for all purposes.

Sometimes, an intermediary device (e.g., intermediary device 230) may be offline due to various reasons (e.g., hardware failure or communication path change). If the intermediary device is not a concentrator device (e.g., not the last intermediary device upstream immediately before a server), then its role is simply to bypass any communication traffic received from the branch device. In this case, when such an intermediary device goes offline, the effect is similar to that segment of the path being a wire. Thus, there is no side effect for such an intermediary going offline.

On the other hand, the intermediary device may be a concentrator device. When a concentrator device goes offline, particular embodiments may rediscover and recover the communication for subsequent traffic flows. Normally, each firewall rule has a lifetime associated with it. When traffic flows through the intermediary devices, and if flow state information is present in an intermediary device, the lifetime of the associated firewall rule is refreshed. However, existing firewall design does not distinguish the directionality of the communication traffic flow and updates the lifetime regardless of the flow direction.

To address this problem, particular embodiments use multiple-hop ADN related firewall rules to track the "last seen" time for each direction of the traffic flow. When traffic has not been seen for a specified amount of time for the downstream direction (e.g., from a server to a branch device), the intermediary devices (e.g., intermediary devices 230-2 and 230-3) may generate a TCP Keep-Alive packet towards the server (e.g., endpoint device 220). If the concentrator device (e.g., intermediary device 230-4) is no longer present in that communication path, and since it is the concentrator device that intercepts the traffic, the Keep-Alive packets from any intermediary device would trigger the server to generate RESET packets as a response. When an intermediary device receives these RESET packets, it clears its current state information associated with that specific traffic flow (e.g., including both level-1 and level-2 rules), and forward the RESET packets downstream toward the branch device (e.g., intermediary device 230-1). This allows the state information generated at the completion of establishing the ADN tunnel to be automatically removed from each in-path intermediary device, thus allowing the ADN multi-hop discovery process to take place again dynamically when traffic destined to the server is seen for the very next time.

When an in-path intermediary device receives a standard TCP SYN-ACK response (e.g., without any additional customized option information), it is an indication that there are just two intermediary devices in the communication path, and this intermediary device is the concentrator device for that path.

Figure 8:
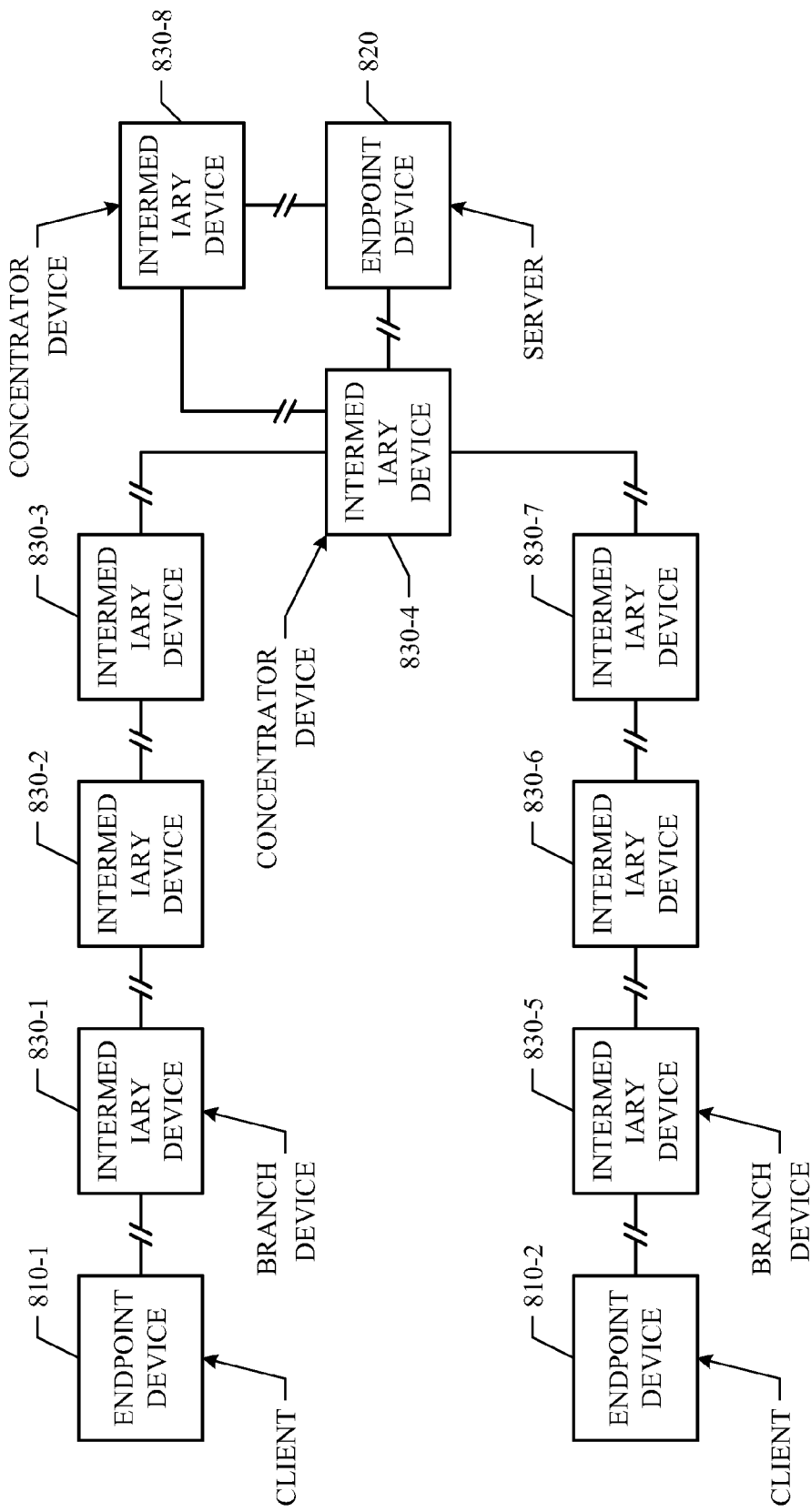
FIG. 8 illustrate example overlapping communication paths between network devices.

In particular embodiments, each intermediary device has distinct firewall rules installed therein for per branch device and per concentrator device. As explained above, a specific device may be situated along multiple communication paths and perform different functions for different communication paths. For example, consider the deployment case illustrated in FIG. 8, where there are multiple communication paths between multiple clients (e.g., endpoint devices 810-1 and 810-2) and a server (endpoint device 820), multiple branch devices (e.g., intermediary devices 830-1 and 830-5), and multiple concentrator devices (e.g., intermediary devices 830-4 and 830-8). In this example, concentrator device 830-4 is the concentrator for branch device 830-1. At the same time, concentrator device 830-4 is also an intermediary device between branch device 830-5 and concentrator device 830-8. Therefore, concentrator device 830-4 may intercept communication traffics from branch device 830-1 but bypass communication traffics from branch device 830-5, despite the fact that the ultimate destination for both traffics is server 820.

Figure 9:
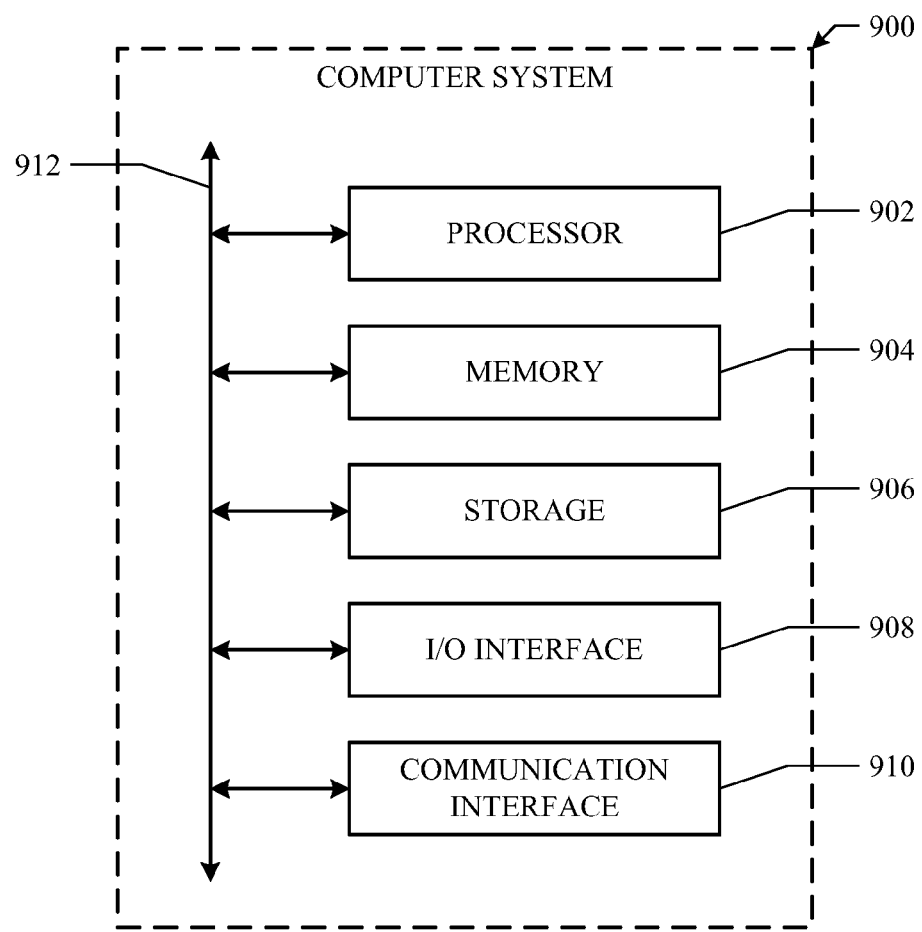
FIG. 9 illustrates an example computer system.

Particular embodiments may be implemented on one or more computer systems. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by a first computing device,
    receiving a first communication packet from a second computing device destined to a third computing device;
    if the first communication packet is a connection-initiating packet having no customization indicator, then:
        generating a second connection-initiating packet having a customization indicator and addressed to the third computing device;
        setting a value of the customization indicator of the second connection-initiating packet to 0; and
        sending the second connection-initiating packet to the third computing device;
    if the first communication packet is a connection-initiating packet having a customization indicator with a value of 0, then:
        generating a third connection-initiating packet having a customization indicator and addressed to the third computing device;
        setting a value of the customization indicator of the third connection-initiating packet to 1; and
        sending the third connection-initiating packet to the third computing device;
    if the first communication packet is a connection-initiating packet having a customization indicator with a value of 1, then:
        generating a first connection-acknowledgement packet having a customization indicator and addressed to the second computing device;
        setting a value of the customization indicator of the first connection-acknowledgement packet to 1; and
        sending the first connection-acknowledgement packet to the second computing device;
    if the first communication packet is a connection-acknowledgement packet having no customization indicator, then:
        installing an intercept rule;
        generating a second connection-acknowledgement packet having a customization indicator and addressed to the second computing device;
        setting a value of the customization indicator of the second connection-acknowledgement packet to 1; and
        sending the second connection-acknowledgement packet to the second computing device; and
    if the first communication packet is a connection-acknowledgement packet having a customization indicator with a value of 1, then:
        installing a bypass rule.

2. The method of claim 1, wherein the first computing device is situated along a communication path in between the second computing device and the third computing device.

3. The method of claim 1, further comprising if the first communication packet is a connection-initiating packet having no customization indicator, then:
    completing a first connection between the first computing device and the second computing device; and
    initiating a second connection between the first computing device and the third computing device.

4. The method of claim 1, further comprising if the first communication packet is a connection-initiating packet having a customization indicator with a value of 0, then:
    suspending a first connection between the first computing device and the second computing device;
    initiating a second connection between the first computing device and the third computing device; and
    holding the first communication packet.

5. The method of claim 1, further comprising if the first communication packet is a connection-acknowledgement packet having a customization indicator with a value of 1, then
    closing a connection between the first computing device and the third computing device; and
    forwarding a previously received connection-initiating packet having a customization indicator with a value of 0 to the third computing device.

6. The method of claim 1, wherein the bypass rule and the intercept rule each comprise a peer identifier, a destination Internet Protocol (IP) address, and a destination port.

7. The method of claim 1, wherein the bypass rule and the intercept rule each comprise a source IP address, a source port, a destination IP address, and a destination port.

8. The method of claim 1, wherein:
    if the first communication packet is a connection-initiating packet having no customization indicator, then the first computing device establishes a transparent connection with a concentrator device; and
    if the first communication packet is a connection-acknowledgement packet having no customization indicator, then first computing device establishes a transparent connection with a branch device.

9. A first system comprising:
a memory comprising instructions executable by one or more processors; and
the one or more processors coupled to the memory and operable to execute the instructions, the one or more processors being operable when executing the instructions to:
  receive a first communication packet from a second system destined to a third system;
  if the first communication packet is a connection-initiating packet having no customization indicator, then:
    generate a second connection-initiating packet having a customization indicator and addressed to the third system;
    set a value of the customization indicator of the second connection-initiating packet to 0; and
    send the second connection-initiating packet to the third system;
  if the first communication packet is a connection-initiating packet having a customization indicator with a value of 0, then:
    generate a third connection-initiating packet having a customization indicator and addressed to the third system;
    set a value of the customization indicator of the third connection-initiating packet to 1; and
    send the third connection-initiating packet to the third system;
  if the first communication packet is a connection-initiating packet having a customization indicator with a value of 1, then:
    generate a first connection-acknowledgement packet having a customization indicator and addressed to the second system;
    set a value of the customization indicator of the first connection-acknowledgement packet to 1; and
    send the first connection-acknowledgement packet to the second system;
  if the first communication packet is a connection-acknowledgement packet having no customization indicator, then:
    install an intercept rule;
    generate a second connection-acknowledgement packet having a customization indicator and addressed to the second system;
    set a value of the customization indicator of the second connection-acknowledgement packet to 1; and
    send the second connection-acknowledgement packet to the second system; and
  if the first communication packet is a connection-acknowledgement packet having a customization indicator with a value of 1, then:
    install a bypass rule.

10. The first system of claim 9, wherein the first system is situated along a communication path in between the second system and the third system.

11. The first system of claim 9, wherein the one or more processors are further operable when executing the instructions to, if the first communication packet is a connection-initiating packet having no customization indicator, then:
  complete a first connection between the first system and the second system; and
  initiate a second connection between the first system and the third system.

12. The first system of claim 9, wherein the one or more processors are further operable when executing the instructions to, if the first communication packet is a connection-initiating packet having a customization indicator with a value of 0, then:
  suspend a first connection between the first system and the second system;
  initiate a second connection between the first system and the third system; and
  hold the first communication packet.

13. The first system of claim 9, wherein the one or more processors are further operable when executing the instructions to, if the first communication packet is a connection-acknowledgement packet having a customization indicator with a value of 1, then
  close a connection between the first system and the third system; and
  forward a previously received connection-initiating packet having a customization indicator with a value of 0 to the third system.

14. The first system of claim 9, wherein the bypass rule and the intercept rule each comprise a peer identifier, a destination Internet Protocol (IP) address, and a destination port.

15. The first system of claim 9, wherein the bypass rule and the intercept rule each comprise a source IP address, a source port, a destination IP address, and a destination port.

16. The first system of claim 9, wherein:
  if the first communication packet is a connection-initiating packet having no customization indicator, then the first system establishes a transparent connection with a concentrator system; and
  if the first communication packet is a connection-acknowledgement packet having no customization indicator, then first system establishes a transparent connection with a branch system.

17. One or more computer-readable non-transitory storage media embodying software operable when executed by a first computer system to:
  receive a first communication packet from a second computer system destined to a third computer system;
  if the first communication packet is a connection-initiating packet having no customization indicator, then:
    generate a second connection-initiating packet having a customization indicator and addressed to the third computer system;
    set a value of the customization indicator of the second connection-initiating packet to 0; and
    send the second connection-initiating packet to the third computer system;
  if the first communication packet is a connection-initiating packet having a customization indicator with a value of 0, then:
    generate a third connection-initiating packet having a customization indicator and addressed to the third computer system;
    set a value of the customization indicator of the third connection-initiating packet to 1; and
    send the third connection-initiating packet to the third computer system;
  if the first communication packet is a connection-initiating packet having a customization indicator with a value of 1, then:
    generate a first connection-acknowledgement packet having a customization indicator and addressed to the second computer system;
    set a value of the customization indicator of the first connection-acknowledgement packet to 1; and
    send the first connection-acknowledgement packet to the second computer system;

if the first communication packet is a connection-acknowledgement packet having no customization indicator, then:
  install an intercept rule;
  generate a second connection-acknowledgement packet having a customization indicator and addressed to the second computer system;
  set a value of the customization indicator of the second connection-acknowledgement packet to 1; and
  send the second connection-acknowledgement packet to the second computer system; and
if the first communication packet is a connection-acknowledgement packet having a customization indicator with a value of 1, then:
  install a bypass rule.

18. The media of claim 17, wherein the first computer system is situated along a communication path in between the second computer system and the third computer system.

19. The media of claim 17, wherein the software is further operable when executed by the first computer system to, if the first communication packet is a connection-initiating packet having no customization indicator, then:
  complete a first connection between the first computer system and the second computer system; and
  initiate a second connection between the first computer system and the third computer system.

20. The media of claim 17, wherein the software is further operable when executed by the first computer system to, if the first communication packet is a connection-initiating packet having a customization indicator with a value of 0, then:
  suspend a first connection between the first computer system and the second computer system;
  initiate a second connection between the first computer system and the third computer system; and
  hold the first communication packet.

21. The media of claim 17, wherein the software is further operable when executed by the first computer system to, if the first communication packet is a connection-acknowledgement packet having a customization indicator with a value of 1, then
  close a connection between the first computer system and the third computer system; and
  forward a previously received connection-initiating packet having a customization indicator with a value of 0 to the third computer system.

22. The media of claim 17, wherein the bypass rule and the intercept rule each comprise a peer identifier, a destination Internet Protocol (IP) address, and a destination port.

23. The media of claim 17, wherein the bypass rule and the intercept rule each comprise a source IP address, a source port, a destination IP address, and a destination port.

24. The media of claim 17, wherein:
  if the first communication packet is a connection-initiating packet having no customization indicator, then the first computer system establishes a transparent connection with a concentrator computer system; and
  if the first communication packet is a connection-acknowledgement packet having no customization indicator, then first computer system establishes a transparent connection with a branch computer system.

* * * * *